United States Patent
Siraj et al.

(10) Patent No.: US 11,277,794 B2
(45) Date of Patent: Mar. 15, 2022

(54) POWER SAVE AWARE RU ALLOCATION

(71) Applicant: Hewlett Packard Enterprise Development LP, Houston, TX (US)

(72) Inventors: Mohd Shahnawaz Siraj, San Jose, CA (US); Sachin Ganu, San Jose, CA (US); Eldad Perahia, Park City, UT (US); Gaurav Patwardhan, Santa Clara, CA (US); Nitin Changlani, Milpitas, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 57 days.

(21) Appl. No.: 16/527,288

(22) Filed: Jul. 31, 2019

(65) Prior Publication Data
US 2021/0037467 A1 Feb. 4, 2021

(51) Int. Cl.
*H04W 52/02* (2009.01)
*H04W 28/02* (2009.01)
*H04W 72/04* (2009.01)

(52) U.S. Cl.
CPC ... *H04W 52/0222* (2013.01); *H04W 28/0221* (2013.01); *H04W 28/0278* (2013.01); *H04W 72/0413* (2013.01); *H04W 72/044* (2013.01)

(58) Field of Classification Search
CPC ......... H04W 52/0222; H04W 52/0212; H04W 52/0209; H04W 52/0225; H04W 28/0221; H04W 28/0278; H04W 72/0413; H04W 72/042
See application file for complete search history.

(56) References Cited

U.S. PATENT DOCUMENTS

| | | | |
|---|---|---|---|
| 7,433,670 B2 | 10/2008 | Benveniste | |
| 9,585,095 B2 | 2/2017 | Merlin et al. | |
| 10,764,921 B2* | 9/2020 | Park | H04W 74/0833 |
| 10,849,157 B1* | 11/2020 | Gopalakrishnan | H04W 74/006 |
| 2016/0219510 A1* | 7/2016 | Asterjadhi | H04W 52/0216 |
| 2016/0315675 A1* | 10/2016 | Seok | H04W 74/0816 |
| 2017/0013607 A1 | 1/2017 | Cariou et al. | |
| 2017/0171810 A1* | 6/2017 | Cariou | H04W 52/0206 |
| 2019/0075583 A1 | 3/2019 | Park et al. | |
| 2020/0236624 A1* | 7/2020 | Kim | H04W 76/28 |

OTHER PUBLICATIONS

Bankov D. et al., OFDMA Uplink Scheduling in IEEE 802.11 ax Networks, (Research Paper), May 2018, 13 Pgs.

* cited by examiner

*Primary Examiner* — Min Jung
(74) *Attorney, Agent, or Firm* — Hewlett Packard Enterprise Patent Department

(57) ABSTRACT

Systems and methods for power save aware resource unit allocation include sending, by an access point to a station, a beacon indicating that the station has data buffered at the access point, wherein the station is in a power-save mode, sending, by the access point after sending the beacon, an Orthogonal Frequency Division Multiple Access (OFDMA) trigger to the station, wherein the OFDMA trigger causes the station in the power-save mode to send PS-POLL using OFDMA, receiving, by the access point and from the station, a PS-POLL frame using OFDMA.

18 Claims, 4 Drawing Sheets

POWER SAVE AWARE RU ALLOCATION

BACKGROUND

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The Institute of Electrical and Electronics Engineers (IEEE) publish many popular specifications for use in wireless under the 802.11 standard family. 802.11 continues to evolve in an attempt to address all challenges presented with the proliferation of wireless devices.

In particular, the IEEE 802.11ax project started in May 2014 with the formation of TGax as a successor to the successful IEEE 802.11ac standard. The main objectives of the TGax was to define a physical layer and a medium access control capable of supporting at least a four times improvement in average throughput per station in a dense deployment scenario when compared to IEEE 802.11ac. However, the 802.11ax standard itself does not address all issues that need to be solved. Further improvements are needed to maximize the potential of 802.11ax.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
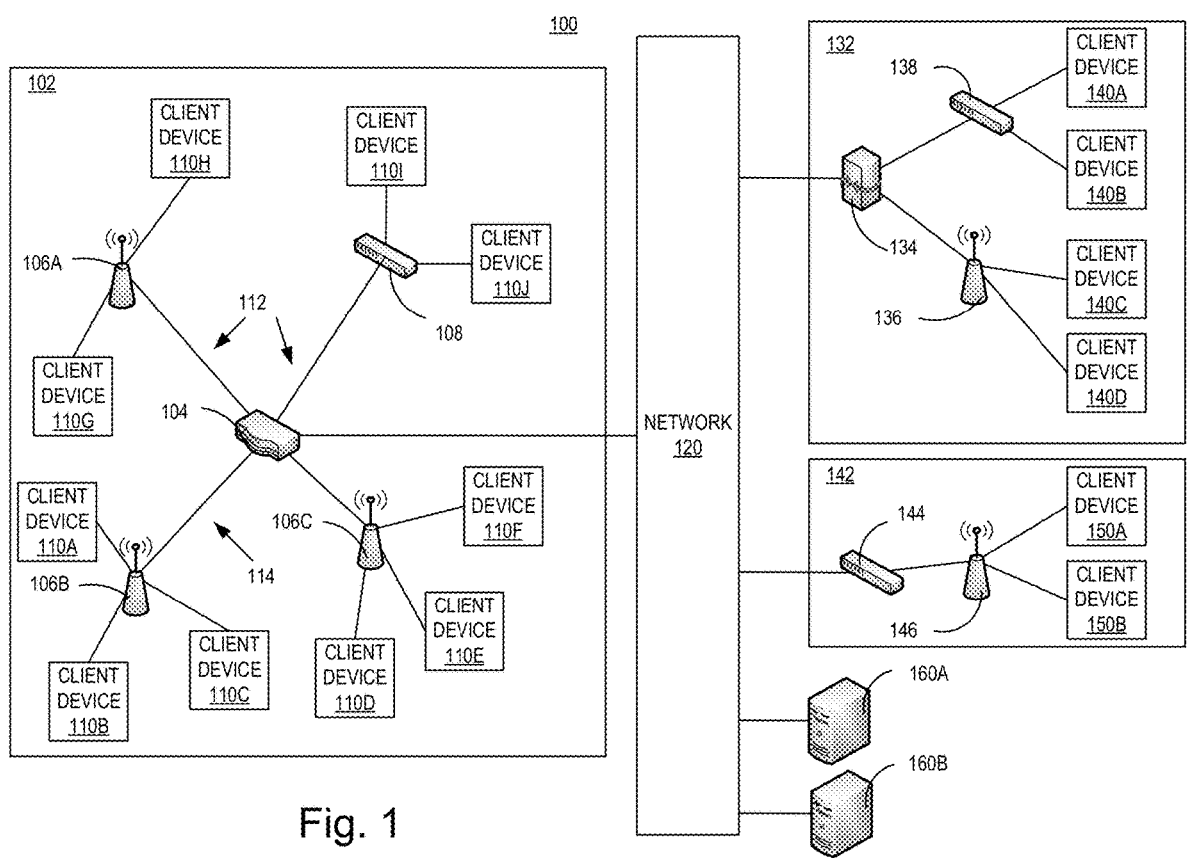
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Implementations of the disclosed technology may include systems and methods to support legacy power save methodologies while simultaneously improving those legacy power save methodologies.

To understand the present invention, a basic understanding of 802.11 and 802.11ax is needed. The minimum understanding necessary is described below, but further detail and guidance may be found in the 802.11ax standard, as well as other related 802.11 standards.

Multi-User Multiple Input Multiple Output (MU-MIMO) allows a wireless device, such as an access point, to communicate with multiple devices simultaneously. This decreases the time each device has to wait for a signal and can dramatically speed up a network. In short, MU-MIMO works by using multiple antennas to send data to multiple devices/stations.

One of the main features added to the 802.11ax specification was Orthogonal Frequency-Division Multiple Access (OFDMA). At a physical layer level it means multiple entities transmitting data at the same time over different frequency tones/subcarriers where the subcarriers are orthogonal to each other. A timeslot containing a certain group of tones is known as a RU.

IEEE 802.11ax defines downlink Multi-User Physical Layer Protocol Data Units (MU-PPDU) in a MU-MIMO format, an OFDMA format, or a mixture of both. The standard also defines uplink MU-PPDU in a MU-MIMO and OFDMA format. For the uplink MU-PPDUs, the access point needs to schedule certain stations within a timeslot to send data on uplink using different RUs. The stations are notified of the transmit characteristics like (transmit power, modulation and coding, etc.) and the specific RU to be used for the uplink transmission.

However, there might be stations which have sporadic data to send on the uplink for which scheduled access would waste bandwidth. This is why uplink OFDMA Random Access (UORA) was added to the specification. This allows stations which are not scheduled to transmit on the uplink to contend for a Random Access Resource Unit (RA-RU). The access point signals the availability of RA-RUs and their usage via a trigger frame by specifying various parameters. The station sets the value of OFDMA Contention Window (OCW) to OCWmin (either the default one or the latest one broadcasted by the access point) and an integer value is randomly selected from a uniform distribution in the range 0 to OCW and assigns the value to the ODFMA Random Access Back Off (OBO) counter. If OBO counter is less than the number of available RA-RUs, then the station sets the OBO counter to 0, selects one of the available RA-RUs randomly and sends the PPDU on it. If the OBO counter is greater than number of RA-RUs, the station updates the OBO counter by decrementing it by the number of eligible RA-RUs and it does not transmit the PPDU. If the STA sends a PPDU in a RA-RU and does not receive an acknowledgement from the AP, it updates its OCW to min (2*OCW+1, OCWmax). On any subsequent successful retransmission it can reset the OCW to OCWmin. It is important to note that RUs and RA-RUs can co-exist in a single UL transmission.

802.11ax introduced Target Wake Time (TWT). TWT is a more efficient mechanism for stations to enter and exit power save by negotiating a wakeup with 802.11ax Access Points (APs) so that the wake up cycles can be scheduled efficiently to reduce contention if multiple STAs wake up at the same time and poll for frames. Thus, TWT is a power saving and scheduling mechanism that enables STAs in power save mode to sleep for periods of time and wake up at pre-scheduled times to exchange information with their AP. The AP defines a set of target wake times and service periods that are used by the station to determine its wake up pattern and duration of time for accessing the medium. Stations can sleep outside of TWT service periods, reducing stations power consumption, and the AP can manage activity in the basic service set by scheduling stations to operate at different times, minimizing contention. STAs should not transmit outside of their TWT service period. TWTs can either be individually negotiated between the station and the AP (Individual TWT) or can be broadcast by the AP in the Beacon frame.

However, until 802.11ax adoption by client devices becomes widespread, the 802.11ax APs are expected to be able to serve non-802.11ax and 802.11ax capable devices. Also, some 802.11ax capable devices may not use the TWT mechanism for power save mode. The legacy power save is not nearly as efficient as TWT. In the legacy power save, when a station goes into power save state, it wakes up at Listen Interval/Delivery Traffic Indication Message (DTIM) time to receive a beacon from the Access Point. It then checks whether its Association ID is set in The Traffic Indication Message (TIM) Information element of the beacon. If the Association ID of the Station is set—then it sends a specific frame to retrieve data from the AP. This Frame is termed as a PS-Poll frame.

Thus, stations listen to beacons every listen interval and check the TIM information element in the beacon to see if there buffered data at the AP for them and, to retrieve the buffered data, stations send PS-POLL to the AP. When multiple stations try to get the buffered frames from the AP they contend for the medium to send PS-POLL. Based on the random backoff interval chosen, only one of the STAs get the transmit opportunity. This mechanism is not very efficient because of: 1) overhead of inter frame spaces and preamble since these are single user transmissions; 2) higher latency; and 3) collisions between multiple stations if multiple stations send a PS-POLL at the same time. This problem will only increase as more stations utilize power save mode more frequently.

Given this background, one can understand how the legacy power save is inefficient and can be improved. Any improvements in supporting the legacy power save mode can result in better frequency reuse, reduced latency, increased efficiency, and better battery life of mobile devices.

As described in more detail with reference to FIG. 1, a Wireless Lan (WLAN) may include a plurality of Access Points (APs), as elements of the WLAN. These APs in the deployed network may be referred to as deployed APs for ease of discussion.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a*-*d*.

In various embodiments, the remote site 132 may be in direct communication with primary site 102, such that client devices 140*a*-*d* at the remote site 132 access the network resources at the primary site 102 as if these clients devices 140*a*-*d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a*-*b* access the network 120. Such a remote site 142 may represent, for example, an individual employee's home or a temporary remote office. The remote site 142 may also be in communication with the primary site 102, such that the client devices 150*a*-*b* at remote site 142 access network resources at the primary site 102 as if these client devices 150*a*-*b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a*-*b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a*-*b*. Content servers 160*a*-*b* may include various providers of multimedia downloadable and/or streaming content, including audio, video, graphical, and/or text content, or any combination thereof. Examples of content servers 160*a*-*b* include, for example, web servers, streaming radio and video providers, and cable and satellite television providers. The client devices 110*a*-*j*, 140*a*-*d*, 150*a*-*b* may request and access the multimedia content provided by the content servers 160*a*-*b*.

Although 10 client devices 110*a*-*j*, or stations (STAs), are illustrated at primary site 102 in the example of FIG. 1, in various applications, a network may include a lesser or greater quantity of STA's. Indeed, some implementations may include a dramatically larger quantities of STAs. For example, various wireless networks may include hundreds, thousands, or even tens of thousands of STAs communicating with their respective APs, potentially at the same time.

Figure 2:
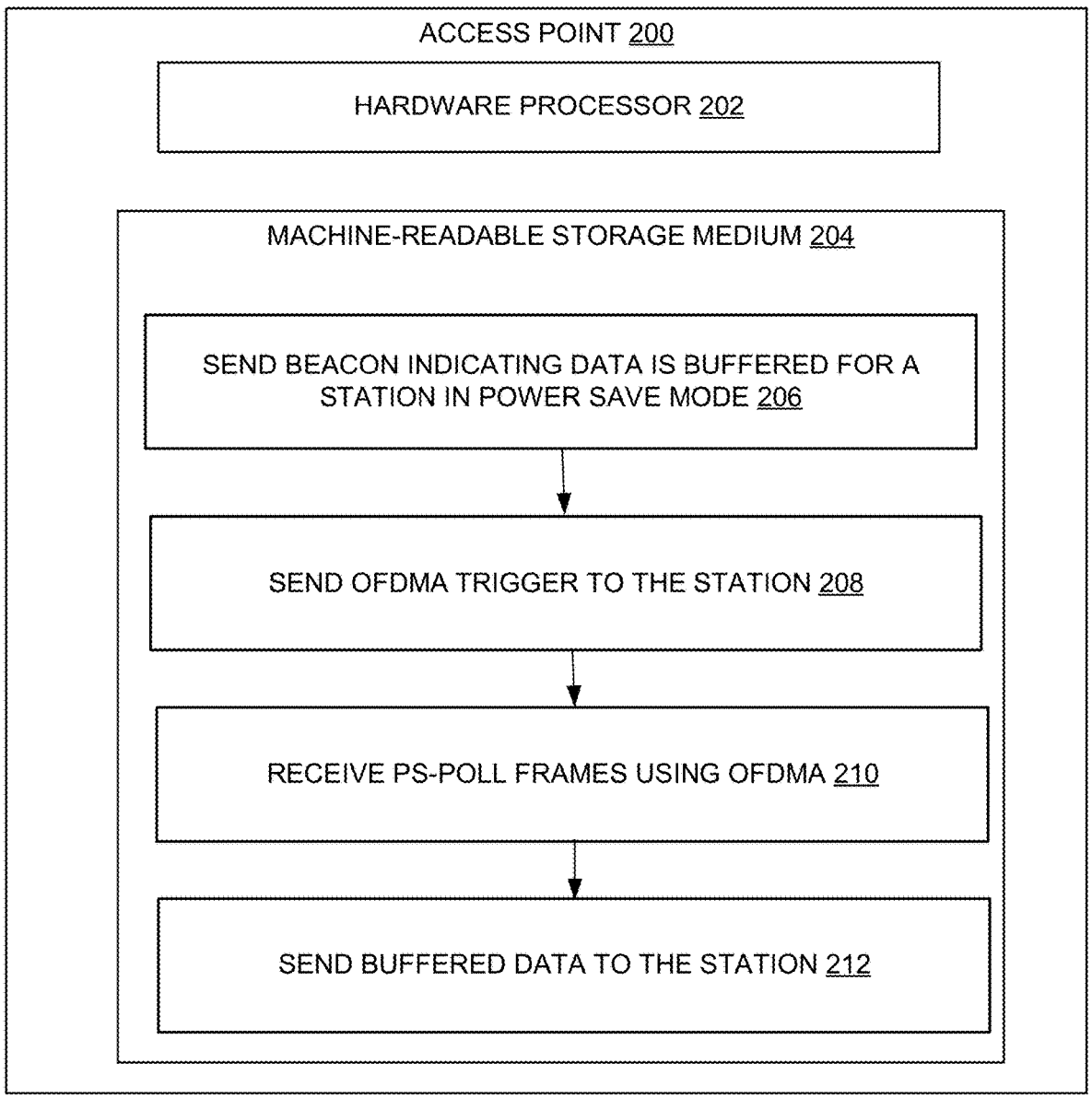
FIG. 2 is a block diagram of an example computing component for power save aware resource unit allocation in accordance with one embodiment.

FIG. 2 is a block diagram of an example access point 200 for power save aware resource unit allocation in accordance with one embodiment. Although the steps depicted in FIG. 2 are shown in an order, the steps may be performed in any order at any time. The hardware processor 202 is able to execute the instructions stored on the machine-readable storage medium 204 to perform the steps described below.

In step 206, a beacon is sent indicating that data is buffered at the AP for at least one station. In particular, the AP is an 802.11ax AP that support but 802.11ax stations and non-802.11ax stations. The station receiving the beacon is utilizing a legacy power save function, and the beacon is a Delivery Traffic Indication Message (DTIM), that indicates whether or not there is data buffered at the AP that needs to be sent to the station(s). Any number of stations may receive the DTIM (such as 1, 5, 10, or more stations), and it may be sent at any time. Typically, the DTIM is sent at a predetermined time when the power saving stations will wake up to listen for the DTIM, so that the stations may determine whether or not there is data for them to receive.

The beacon may be sent in any suitable manner, and may be in any suitable format. The beacon may indicate that there is data buffered for the stations in any manner. Typically, an information element (that is associated with an identifier of a particular station) will be set to indicate that there is data buffered at the AP for that particular station, although any other method may be used.

In step 208, an OFDMA trigger is sent to the station. The OFDMA trigger may be sent in any format, at any time, and to any number of stations. The timing of sending the OFDMA trigger is important—if the trigger is sent to slow, then the legacy power save stations may receive the DTIM beacon and respond with the PS-POLL in a single user transmission, as is common. The PS-POLL response will typically occur at the Distributed Coordination Function Inter Frame Space (DIFS) interval, although other size delays are possible. Thus, the OFDMA trigger should be sent on an interval shorter than DIFS. Short Inter Frame Space (SIFS) is one good option to use. If the OFDMA trigger is sent in the SIFS interval after the DTIM beacon, then the stations that have data buffered at the AP will receive the OFDMA trigger before they can send a PS-POLL, and thus be preempted from using a single user transmission for sending PS-POLL.

In the OFDMA trigger many different things may be specified. These include, but are not limited to: the length of the uplink window, the list of stations that may send during the uplink window, allocation of resources for the uplink Multi-User Physical Layer Protocol Data Unit (PPDUs) (such as Resource Unit (RU) allocation, spatial stream allocation, Modulation Coding Scheme (MCS) to be used, etc.), or any other suitable setting or element. Thus, the AP may control precisely how these legacy power saving stations interact with the AP, and therefore may optimize the use of the channel capacity and general efficiency of the network.

In step 210, PS-POLL frames are received using OFDMA. The frames may be received in any format, at anytime, from any number of stations simultaneously. The PS-POLL frames will typically be received via the particular RU assigned to the station from which the PS-POLL is received, although Random Access RUs could also be used.

Optionally, other frames may be received by the access point from the stations. For example, frames may be received that indicate that the stations are no longer in power save mode, and thus the access point may return to treating the station as a "normal" non-power-save station. Alternatively, any other frames may be received by the access point from the station, using OFDMA or any other method or format of transmission.

Stations not in power-save mode may continue to send frames in any manner now known or later developed, and may be handled by the access point in any suitable method. In particular, the PS-POLL frames and data/frames from non-power saving stations may be received in the same OFDMA transmission. The because the access point knows how many power saving stations have buffered data, the access point can schedule those stations as needed via the OFDMA trigger frame, and allocate additional RUs or RA-RUs to other, non-power saving, stations. Many different combinations of how the RUs and RA-RUs may be allocated are possible, and the invention should not be limited to the above examples.

In step 212, buffered data is sent to the station. The buffered data may be sent in any format, using any method, at any time. Typically, MU-MIMO or OFDMA will be used to send the buffered data, although a combination thereof or other alternatives may also be used. The buffered data may be of any size or type. The buffered data may relate to any number of stations, and thus the transmissions may be directed to any number of stations. After receiving the data, the stations may return to sleep or may take any other action as needed in response to the received data.

The process described above may repeat itself as many times as needed, and at any interval. By using the process above, legacy power save stations may be more efficiently managed by an 802.11ax access point than was previously possible.

Figure 3:
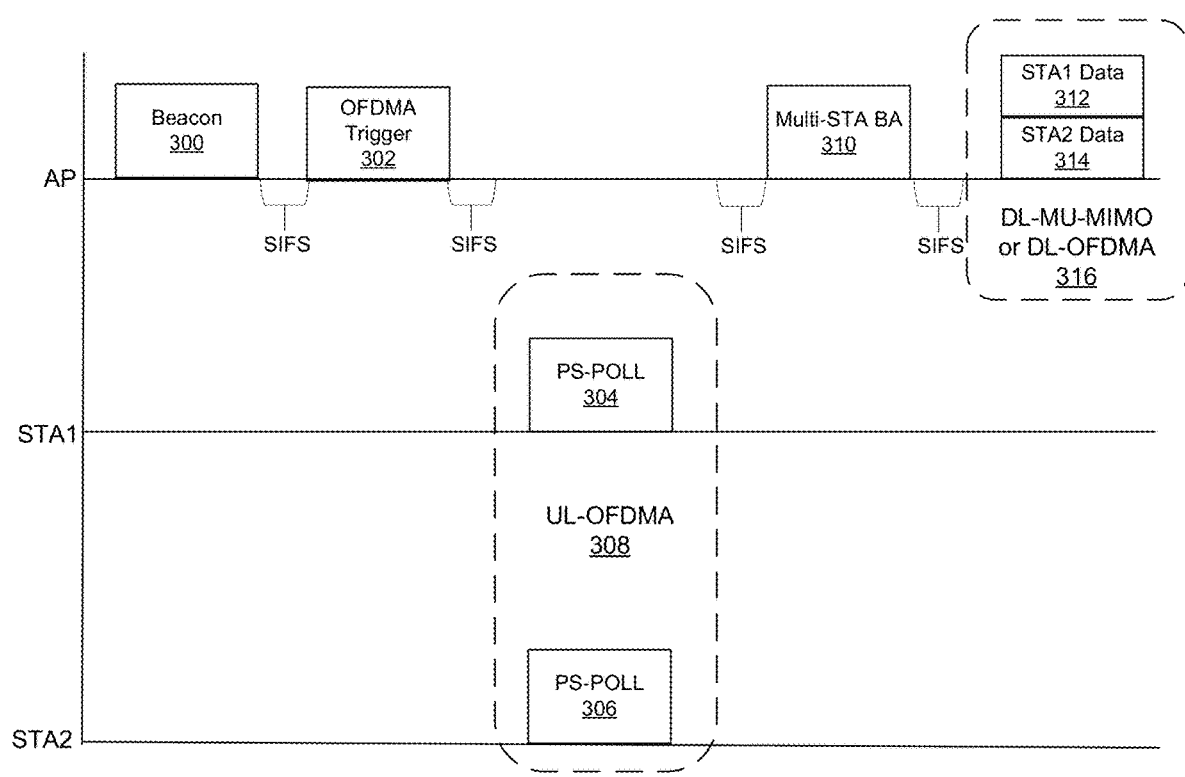
FIG. 3 illustrates an example of power save aware resource unit allocation in accordance with one embodiment.

FIG. 3 illustrates an example of power save aware resource unit allocation in accordance with one embodiment. In particular, this example shows the how the invention works with an AP, a first station STA1, and a second station STA2. The AP supports 802.11ax stations, as well as non-802.11ax stations. STA1 and STA2 are legacy stations that are currently in a power save mode.

Initially, beacon 300 is sent by the AP at a designated interval or timing. The beacon 300 is sent to STA1 and STA2 in any manner now known or later developed, and indicates to STA1 and STA2 that there is data buffed on the AP for both STA1 and STA2.

Then, after the SIFS, the AP follows up beacon 300 with an OFDMA trigger 302. The OFDMA trigger may include various information to enable STA1 and STA2 to transmit their PS-POLLS via OFDMA including, but not limited to: the length of the uplink window, the list of stations that may send during the uplink window, allocation of resources for the uplink Multi-User Physical Layer Protocol Data Unit (PPDUs) (such as Resource Unit (RU) allocation, spatial stream allocation, Modulation Coding Scheme (MCS) to be used, etc.), or any other suitable setting or element. Thus, the AP may control precisely how these legacy power saving stations interact with the AP, and therefore may optimize the use of the channel capacity and general efficiency of the network.

Because the OFDMA trigger 302 is sent at the SIFS interval, it arrives at STA1 and STA2 before they are able to respond with a single user PS-POLL and preempts STA1 and STA2 from using a single user transmission to respond.

Then, after the SIFS, an UL-OFDMA transmission is sent by both STA1 and STA2, consisting of their PS-POLL 304, 306. The AP receives this OFDMA transmission and responds with the Multi-STA Block Acknowledgement 310. Subsequently, the AP sends STA1 Data 312 and STA2 Data 314 using a DL-MU-MIMO transmission or a DL-OFDMA transmission.

Figure 4:
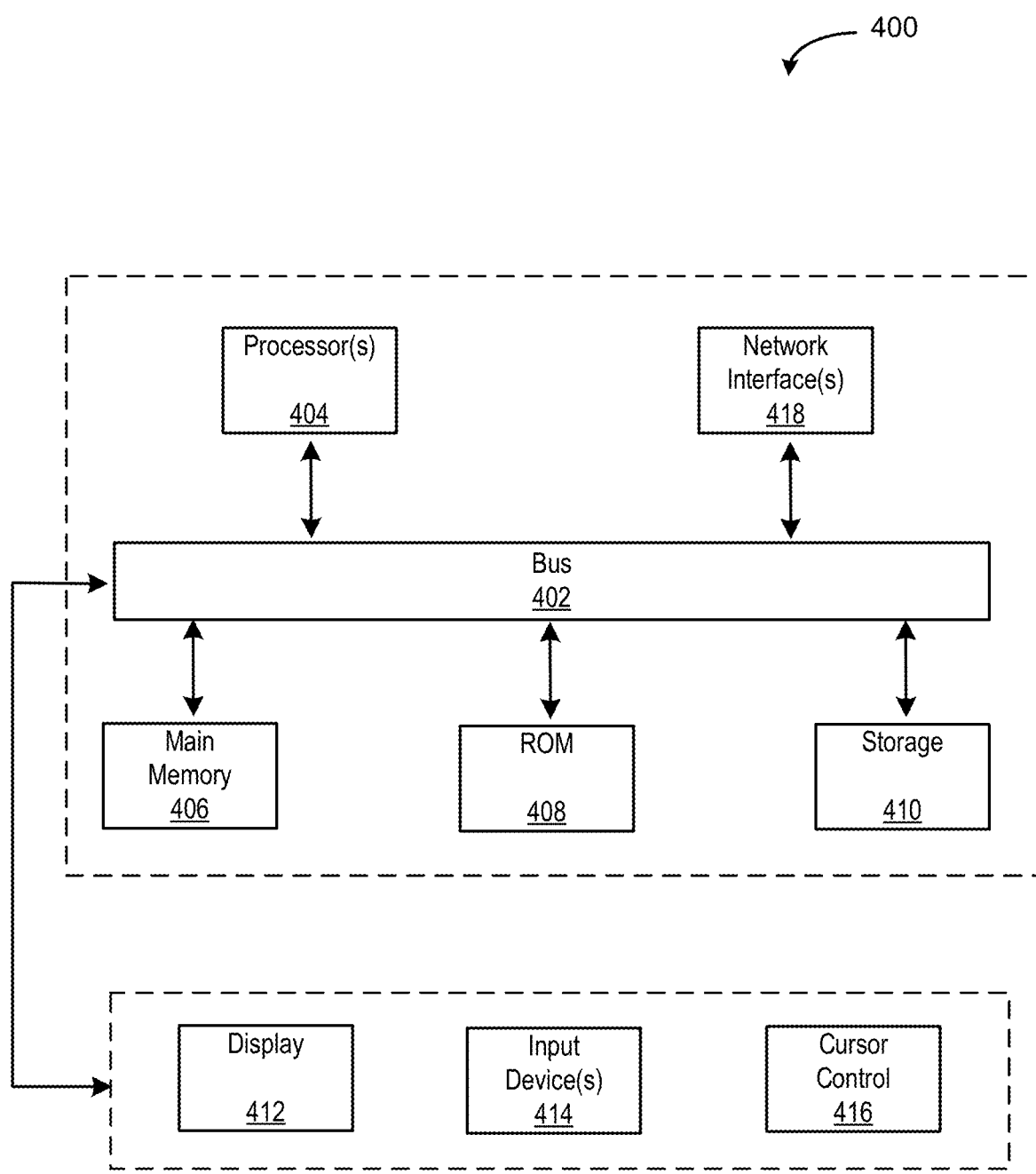
FIG. 4 is an example computing component that may be used to implement various features of embodiments described in the present disclosure.

FIG. 4 depicts a block diagram of an example computer system 400 in which various of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
sending, by an access point to a station, a beacon indicating that the station has data buffered at the access point, wherein the station is in a legacy power-save mode;
sending, at an interval shorter than a Distributed Coordination Function Inter Frame Space (DIFS) by the access point after sending the beacon, an Orthogonal Frequency Division Multiple Access (OFDMA) trigger to the station, wherein the OFDMA trigger causes the station in the legacy power-save mode to send PS-POLL using OFDMA instead of a single user transmission;
receiving, by the access point and from the station, a PS-POLL frame using OFDMA.

2. The method of claim 1, wherein the OFDMA trigger is sent at a Short Inter-Frame Space (SIFS) interval.

3. The method of claim 1, wherein the station in the power-save mode sends any frame other than PS-POLL that indicates that the station is out of the power-save mode.

4. The method of claim 1, wherein the access point supports 802.11ax.

5. The method of claim 1, wherein data from a different station is received in a same OFDMA transmission as the PS-POLL of the station, wherein the different station is not in a power save mode.

6. The method of claim 1, wherein the OFDMA trigger includes one or more of the following: a length of an uplink window, a list of stations that may send during the uplink window, a resource unit allocation, a spatial stream allocation, and a Modulation Coding Scheme (MCS) to use.

7. The method of claim 1, further comprising:
sending, by the access point in response to the PS-POLL frame, the data buffered at the access point to the station.

8. A non-transitory machine-readable storage medium encoded with instructions executable by a hardware processor of a computing component, the machine-readable storage medium comprising instructions to cause the hardware processor to:
send, to a station, a beacon indicating that the station has data buffered at the access point, wherein the station is in a legacy power-save mode;
send, at an interval shorter than a Distributed Coordination Function Inter Frame Space (DIFS) after sending the beacon, an Orthogonal Frequency Division Multiple Access (OFDMA) trigger to the station, wherein the OFDMA trigger causes the station in the legacy power-save mode to send PS-POLL using OFDMA instead of a single user transmission;
receive, from the station, a PS-POLL frame using OFDMA.

9. The non-transitory machine-readable storage medium of claim 8, wherein the OFDMA trigger is sent at a Short Inter-Frame Space (SIFS) interval.

10. The non-transitory machine-readable storage medium of claim 8, wherein the station in the power-save mode sends any frame other than PS-POLL that indicates that the station is out of the power-save mode.

11. The non-transitory machine-readable storage medium of claim 8, wherein the access point supports 802.11ax.

12. The non-transitory machine-readable storage medium of claim 8, wherein data from a different station is received in a same OFDMA transmission as the PS-POLL of the station, wherein the different station is not in a power save mode.

13. The non-transitory machine-readable storage medium of claim 8, wherein the OFDMA trigger includes one or more of the following: a length of an uplink window, a list of stations that may send during the uplink window, a resource unit allocation, a spatial stream allocation, and a Modulation Coding Scheme (MCS) to use.

14. The non-transitory machine-readable storage medium of claim 8, the instructions further causing the hardware processor to:
send, in response to the PS-POLL frame, the data buffered at the access point to the station.

15. An access point, comprising:
a processor;
a memory, the memory storing instructions which, when executed by the processor, cause the processor to:
send, to a station, a beacon indicating that the station has data buffered at the access point, wherein the station is in a legacy power-save mode;
send, at an interval shorter than a Distributed Coordination Function Inter Frame Space (DIFS) after sending the beacon, an Orthogonal Frequency Division Multiple Access (OFDMA) trigger to the station, wherein the OFDMA trigger causes the station in the legacy power-save mode to send PS-POLL using OFDMA instead of a single user transmission;
receive, from the station, a PS-POLL frame using OFDMA.

16. The access point of claim 15, wherein the OFDMA trigger is sent at a Short Inter-Frame Space (SIFS) interval.

17. The access point of claim 15, wherein the station in the power-save mode sends any frame other than PS-POLL that indicates that the station is out of the power-save mode.

18. The access point of claim 15, wherein data from a different station is received in a same OFDMA transmission as the PS-POLL of the station, wherein the different station is not in a power save mode.

* * * * *